(12) United States Patent
Krenzer et al.

(10) Patent No.: US 7,390,148 B2
(45) Date of Patent: Jun. 24, 2008

(54) BORING TOOL AND A CUTTING INSERT THEREFOR

(75) Inventors: Ulrich Krenzer, Zirndorf (DE); Werner Just, Bad Windsheim (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/464,279

(22) Filed: Aug. 14, 2006

(65) Prior Publication Data

US 2007/0056413 A1   Mar. 15, 2007

Related U.S. Application Data

(63) Continuation-in-part of application No. PCT/EP2005/001386, filed on Feb. 11, 2005.

(30) Foreign Application Priority Data

Feb. 17, 2004   (DE) .................. 20 2004 002 491

(51) Int. Cl.
   *B23C 5/20*   (2006.01)
(52) U.S. Cl. .................. 407/30; 407/113; 407/114; 407/115; 407/116; 407/33
(58) Field of Classification Search ................ 407/113, 407/114, 115, 116, 30, 53, 33; 82/1.11, 904
   See application file for complete search history.

(56) References Cited

U.S. PATENT DOCUMENTS

| | | | | |
|---|---|---|---|---|
| 4,131,383 A | * | 12/1978 | Powers ..................... 407/114 |
| 4,318,644 A | * | 3/1982 | Seidel ....................... 407/114 |
| 5,197,831 A | * | 3/1993 | Shiratori et al. ............ 407/114 |
| 5,456,557 A | * | 10/1995 | Bernadic et al. ........... 407/114 |
| 5,720,583 A | * | 2/1998 | Bohnet et al. ................ 407/42 |
| 5,810,521 A | * | 9/1998 | Pantzar et al. .............. 407/114 |
| 6,146,063 A | * | 11/2000 | Ramold et al. ............. 407/113 |
| 6,217,263 B1 | * | 4/2001 | Wiman et al. .............. 407/114 |
| 6,244,791 B1 | * | 6/2001 | Wiman et al. .............. 407/114 |
| 6,783,306 B2 | * | 8/2004 | Popke ........................ 407/113 |
| 7,168,512 B2 | * | 1/2007 | Schuffenhauer et al. .... 175/426 |

* cited by examiner

*Primary Examiner*—Willmon Fridie, Jr.
(74) *Attorney, Agent, or Firm*—Nils H. Ljungman & Associates

(57) ABSTRACT

This invention relates to a boring tool having a cutting insert. The insert has a chip breaker with a base that extends from the secondary cutting edge to the primary cutting edge. The primary cutting edge, which is also referred to below as the major cutting edge, thereby runs diagonally with respect to the insert surface or top face of the indexable insert toward the chip breaker base of the chip breaker. The secondary cutting edge, which is also referred to as the minor cutting edge below and is advantageously straight, descends toward the major cutting edge, as a result of which a wiper geometry is realized on the minor cutting edge. Therefore the major cutting edge and the minor cutting edge preferably form a closed triangle with the chip breaker base.

17 Claims, 8 Drawing Sheets

BORING TOOL AND A CUTTING INSERT THEREFOR

CONTINUING APPLICATION DATA

This application is a Continuation-In-Part application of International Patent Application No. PCT/EP2005/001386, filed on Feb. 11, 2005, which claims priority from Federal Republic of Germany Patent Application No. 20 2004 002 491.8, filed on Feb. 17, 2004. International Patent Application No. PCT/EP2005/001386 was pending as of the filing date of this application. The United States was an elected state in International Patent Application No. PCT/EP2005/001386.

BACKGROUND

1. Technical Field

This application relates to an insert with an insert surface and insert side faces, and with a primary cutting edge that adjoins a secondary cutting edge via a corner cutting edge. This application further relates to a boring tool or drilling tool, such as a boring tool or drilling tool with precision adjustment, with such an insert.

2. Background Information

A boring tool, such as a precision boring tool, generally has a fine adjustment device with which an insert that is generally detachably mounted on the tool head can be adjusted in the radial direction, relative to the tool axis, to various bore diameters for the purpose of turning or boring. In that regard, the inserts or cutting inserts that have been used up to now are frequently realized in the form of indexable inserts. An indexable insert has an insert surface and, opposite it, an additional insert face or base surface as well as insert side faces that connect with the insert surface. In the case of a square or rhombic insert, the insert comprises four insert side faces. In the vicinity of an index corner, which can also be realized in the form of a corner cutting edge, adjacent to the corner cutting edge is a primary cutting edge and a secondary cutting edge of the insert.

OBJECT OR OBJECTS

The object of at least one possible embodiment is to create an improved insert for use in a boring tool or precision boring tool with, in at least one possible, a precision adjustment device. An additional object of at least one possible embodiment is to create a boring tool with such an insert, such as for finishing with high finish or surface quality.

SUMMARY

With regard to the insert, at least one possible embodiment teaches that this object can be achieved by the features of claim 1. For this purpose, in the area near the corner, the insert has a chip breaker with a base that extends from the secondary cutting edge to the primary cutting edge. The primary cutting edge, which is also referred to below as the major cutting edge, thereby runs diagonally with respect to the insert surface or top face of the indexable insert toward the chip breaker base of the chip breaker. The secondary cutting edge, which is also referred to as the minor cutting edge below and is advantageously straight, descends toward the major cutting edge, as a result of which a wiper geometry is realized on the minor cutting edge. Therefore the major cutting edge and the minor cutting edge, in at least one possible embodiment, form a closed triangle with the chip breaker base.

In one advantageous configuration, the chip breaker forms a cutting face that descends from the corner cutting edge to the chip breaker base. Relative to the insert surface, this cutting face is thus inclined toward the center of the insert. In addition, the chip breaker forms a rear surface of the cutting face that is also called a back cutting face below, which advantageously ascends from the chip breaker base toward the insert surface, i.e., it descends from the insert surface toward the chip breaker base. Consequently, a back upper edge of the back cutting face is formed which extends in the plane of the insert. This back upper edge plus the primary cutting edge and the secondary cutting edge likewise form a triangle.

The base of the chip breaker, in at least one possible embodiment, is hollowed out in the manner of a channel or a trough with a curved or circular trough or channel crown. The base of the chip breaker advantageously runs to the primary cutting edge at an angle between 45° and 90°, or, in at least one possible embodiment, at an angle of 70°±10°.

In another possible embodiment of the insert, a wiper cutter, i.e., a finishing or wiper cutter using wiper geometry, is realized on its secondary cutting edge. The primary cutting edge and the secondary cutting edge are, in at least one possible embodiment, at an angle of approximately 80° with respect to each other.

The insert, which, in at least one possible embodiment, is realized in the form of an indexable insert, has a negative rake angle between the insert surface and a secondary cutter that runs on the secondary cutting edge toward the corner cutting edge which, in at least one possible embodiment, is between −6° and −20°. A positive rake or side rake angle between the insert surface and the base of the chip breaker, in at least one possible embodiment, is between +6° and +30°.

With regard to the boring tool, in at least one possible embodiment it includes a precision adjustment device as well as an insert according to the invention which is detachably mounted on the boring tool. The boring tool can thereby be equipped with a replaceable or interchangeable boring or turning head on which the insert is detachably mounted. The insert can also be replaceably mounted in an insert cassette, which for its part is detachably mounted on the periphery of the boring tool or of a precision boring head or precision turning head.

The advantages achieved by at least one possible embodiment consist of the fact that, such as with the use of an insert according to at least one possible embodiment in a precision boring head or precision turning tool, a comparatively high forward feed (or a larger l/d ratio) is made possible, whereby vibration problems or inaccuracies are avoided. An additional advantage that is achieved when the insert with the chip breaker that acts at the primary cutting edge is used, and such as in combination with the wiper geometry on the secondary cutting edge, is that the chip formed during the boring or turning action during fine boring or fine drilling machining operations is reliably directed away from the boring wall toward the center without damaging the machined surface of the boring, e.g., by scratching it.

A particularly fine or smooth surface with a high finish or surface quality with especially low surface roughness that is obtained by the use of an insert according to at least one possible embodiment during the boring or precision boring of a workpiece, i.e., particularly during the finishing operation, is advantageously achieved in that as a result of the geometry according to at least one possible embodiment, the chip breaker does not run parallel to the primary cutting edge, but instead extends at an angle of 45° to less than 90° in relation to it.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments are explained in greater detail below with reference to the accompanying drawing, in which.

DESCRIPTION OF EMBODIMENT OR EMBODIMENTS

Figure 1:
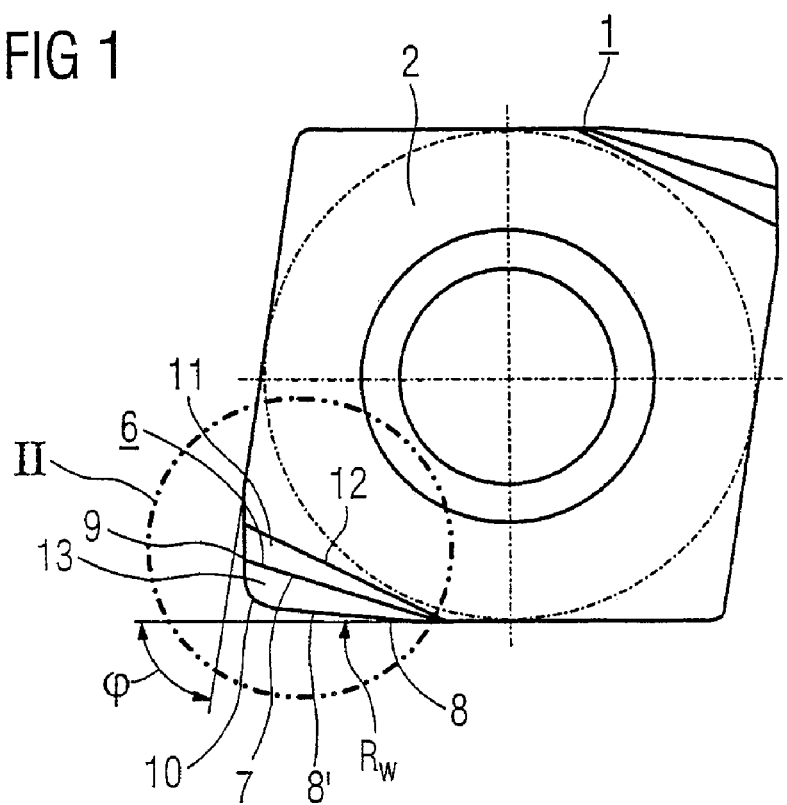
FIG. 1 is an overhead view of an insert according to at least one possible embodiment.

Parts that correspond to each other have been given the same reference number in all the figures.

The insert 1 that is shown in FIGS. 1 through 5 and in various views in FIGS. 6 through 12 has an insert surface 2 and an additional insert surface 4, which is also called the base surface below, as well as four insert side faces 5. The latter run between the two insert surfaces 2 and 4 at an acute or obtuse angle, according to at least one possible embodiment. The shape of the insert 1 can also be rhombic, triangular or polygonal, e.g., hexagonal.

Provided in the region of the insert 1 near the corner is a chip breaker 6. The chip breaker forms a chip breaker base 7, which extends from a secondary cutting edge 8 to a primary cutting edge 9 of the insert 1. In this region near the corner, which is shown on an enlarged scale in FIG. 2, the insert 1 has a corner cutting edge 10. This corner cutting edge is provided with a specified corner or insert radius, e.g. ($R_S$=0.4), and is thus rounded.

Figure 2:
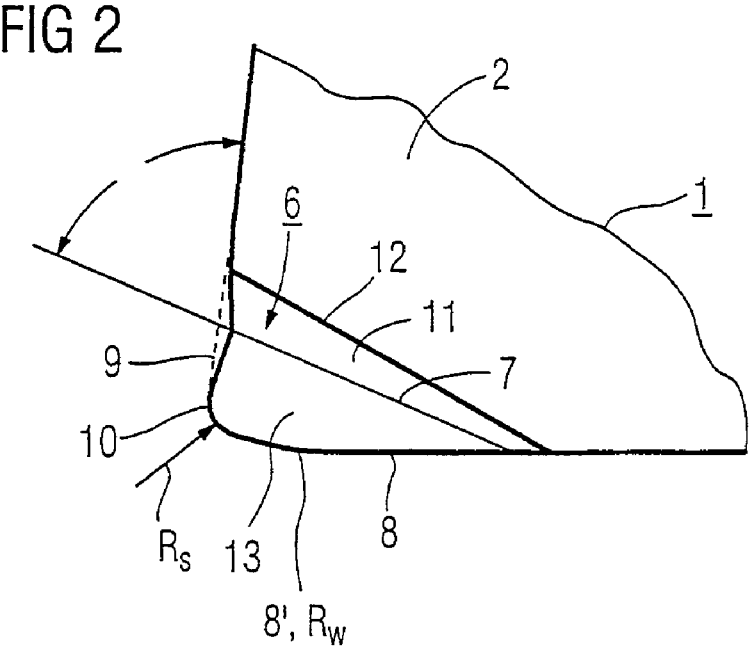
FIG. 2 is a detail from FIG. 1 on an enlarged scale of the insert in the vicinity of an insert corner with a chip breaker according to at least one possible embodiment.

As can be seen in particular from FIGS. 1 and 2 as well as FIGS. 8 through 12, the secondary cutting edge 8 and the primary cutting edge 9 together with the chip breaker base 7 form a triangle or triangular face. A chip breaker 6 cutting face back 11 that extends from the chip breaker base 7 to the insert surface 2 forms a back upper edge 12 at the insert surface 2. This back upper edge 12 also forms a triangle or triangular face together with the secondary cutting edge 8 and the primary cutting edge 9. The cutting face back 11 thereby ascends from the chip breaker base 7 to the insert surface 2. In other words. the cutting face back 11 descends from the back upper edge 12 on the insert surface 2 to the chip breaker base 7.

The chip breaker 6 additionally forms a cutting face 13. The latter in turn extends in a triangular shape or triangular face shape between the chip breaker base 7 and the primary cutting edge 9 and secondary cutting edge 8. The cutting face 13 descends from the corner cutting edge 10 to the chip breaker base 7. In other words, the cutting face 13 is inclined from the corner cutting edge 6 toward the insert surface 2.

Figure 3:
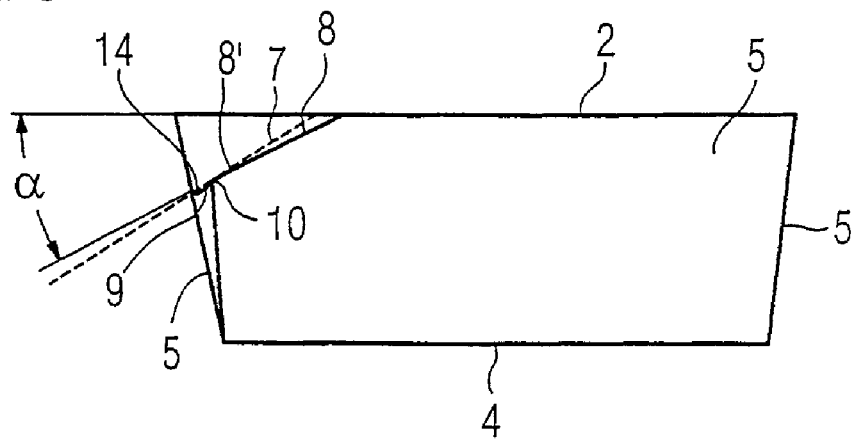
FIG. 3 shows the insert in a side view of the chip breaker.
Figure 4:
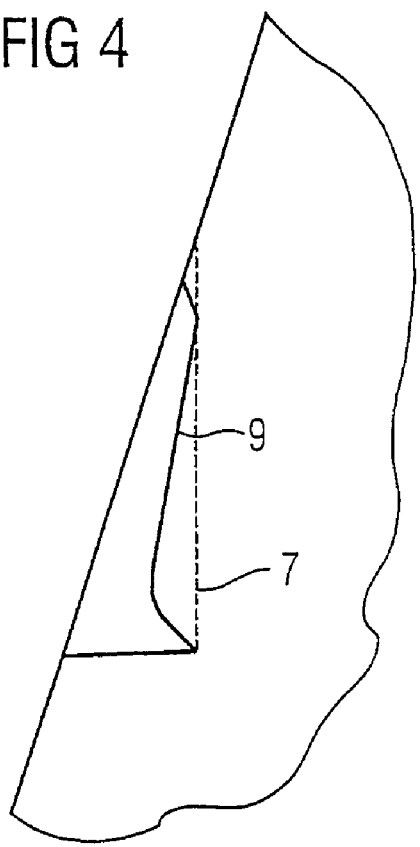
FIGS. 4 and 5 are views of various details of the insert.
Figure 5:
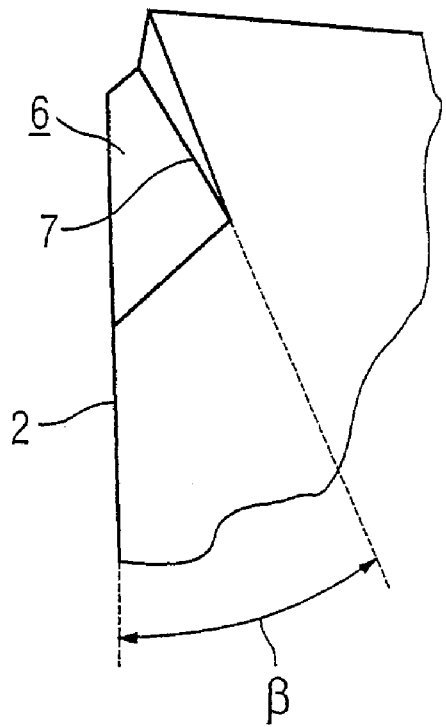
Figure 6:
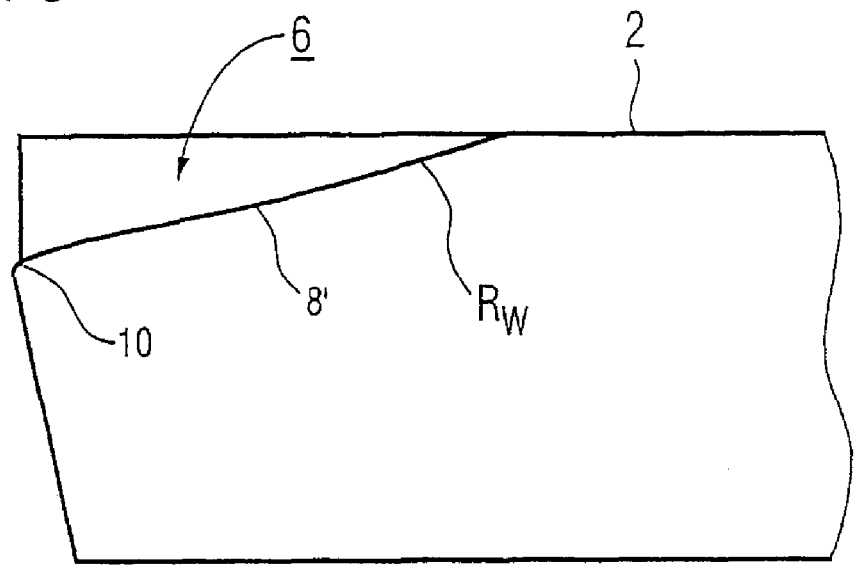
FIGS. 6 to 12 present various views of the insert, particularly in the vicinity of the chip breaker.
Figure 7:
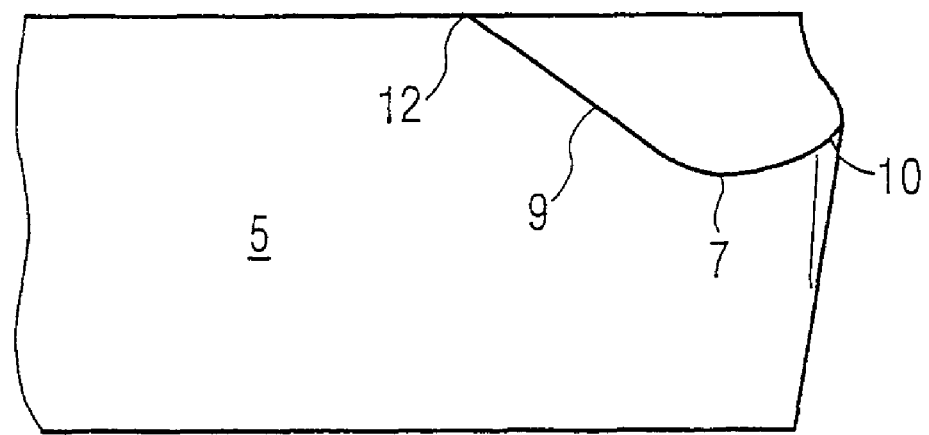
Figure 8:
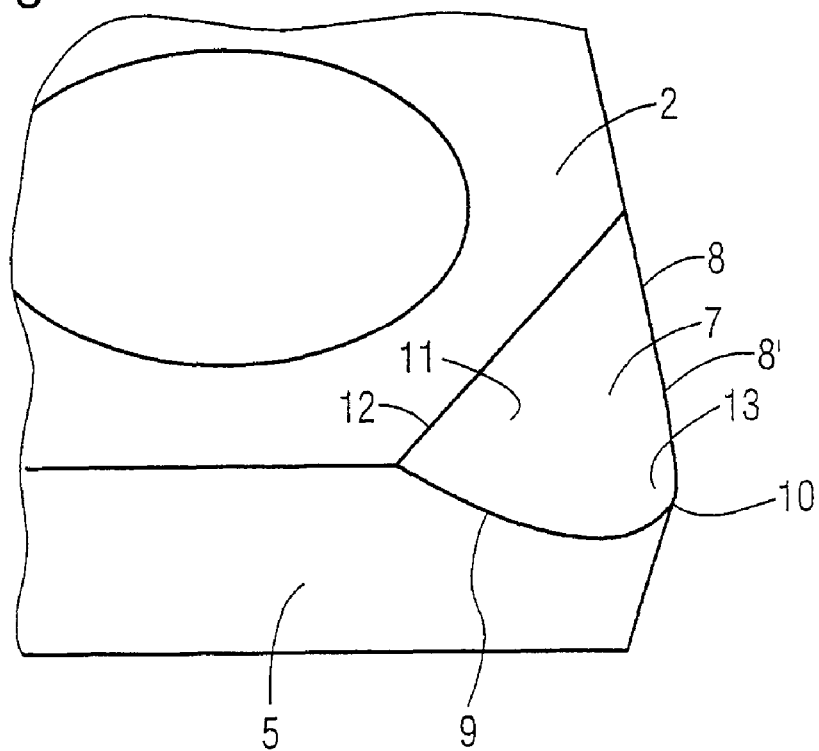
Figure 9:
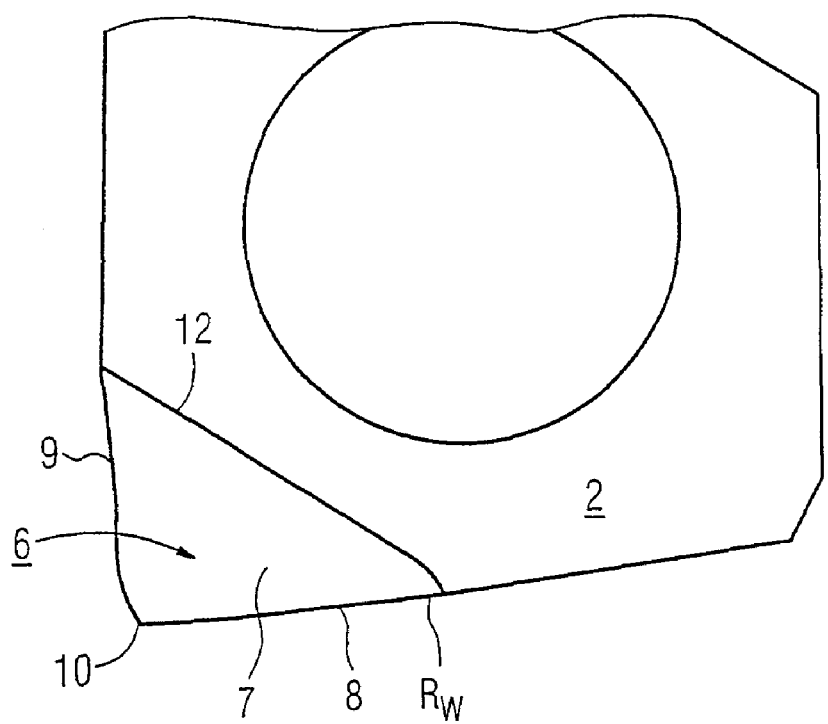
Figure 10:
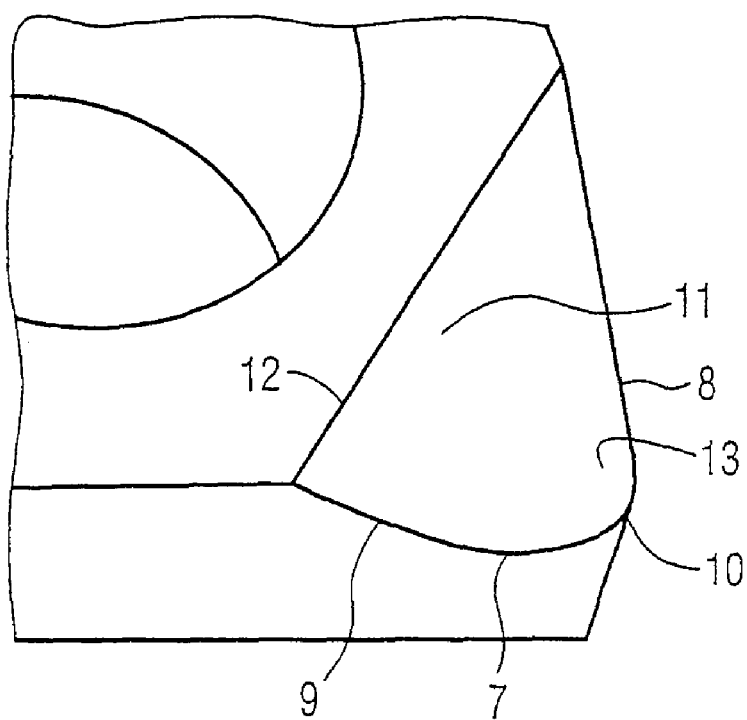
Figure 11:
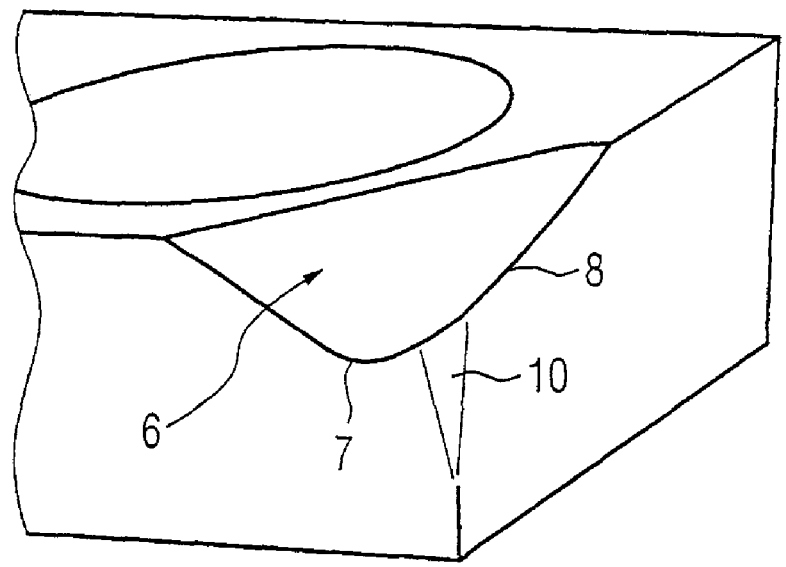
Figure 12:
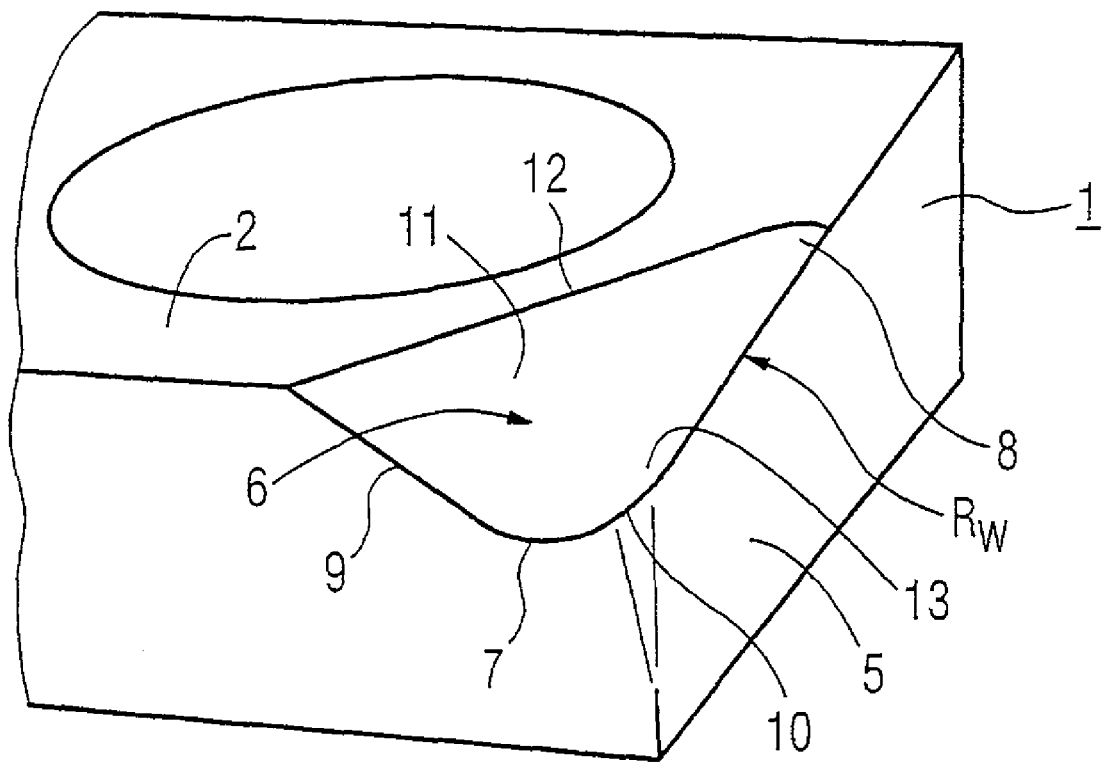

As can be seen from FIG. 3 as well as from FIGS. 7 though 12, the chip breaker base is formed with a channel-like or trough-like shape. The chip breaker base bottom 14 of the chip breaker base 7 is thus curved convexly relative to the insert surface 2, i.e., it is hollowed out of the insert 1 or is recessed into the insert 1 in the form of a trough and is thus curved.

As can be seen from FIG. 1, the secondary cutting edge 8 and the primary cutting edge 9 run toward each other at an acute angle φ, such as, in at least one possible embodiment, at φ=80°. A negative rake angle a in FIG. 2 between the insert surface 2 and a secondary cutter 8' in the progression from the secondary cutting edge 8 toward the corner cutting edge 10 lies, in at least one possible embodiment, between α=−6° and α=−20°. A positive side angle or side rake β between the insert surface 2 and the chip breaker base 7 of the chip breaker 6 is, in at least one possible embodiment, between β=+6° and β=30°.

The secondary cutting edge 8 is designed using wiper geometry $R_W$. In this wiper geometry, the secondary cutting edge 8 and the secondary cutter 8' act as a finishing or wiper cutter. The associated wiper radius $R_W$ is $R_W$=5.0. The primary cutting edge 9 thereby runs at an angle with respect to the insert surface or top face 2 of the cutting insert 1 toward the chip breaker base 7 of the chip breaker 6. The secondary cutting edge 8 is straight and descends toward the primary cutting edge 9 and thereby realizes the wiper geometry on the secondary cutting edge or secondary cutter 9. The primary cutting edge 9 and the secondary cutting edge 8 as well as the chip breaker base 7, in at least one possible embodiment, form a closed triangle.

Figure 13:
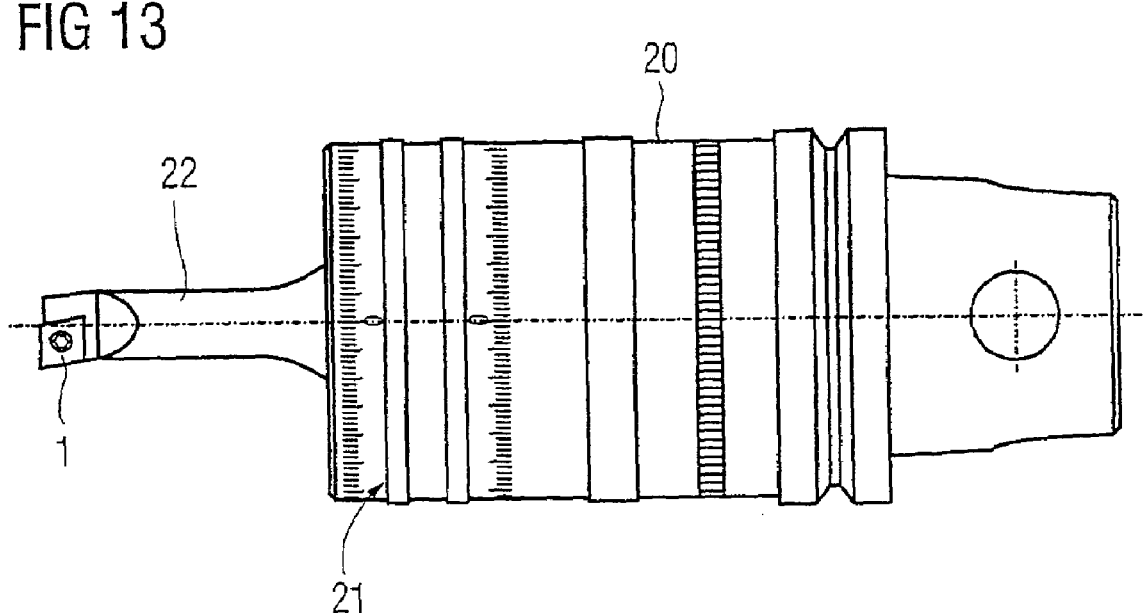
FIG. 13 shows a boring tool with a precision adjustment device and insertable tool head or boring head.
Figure 15:
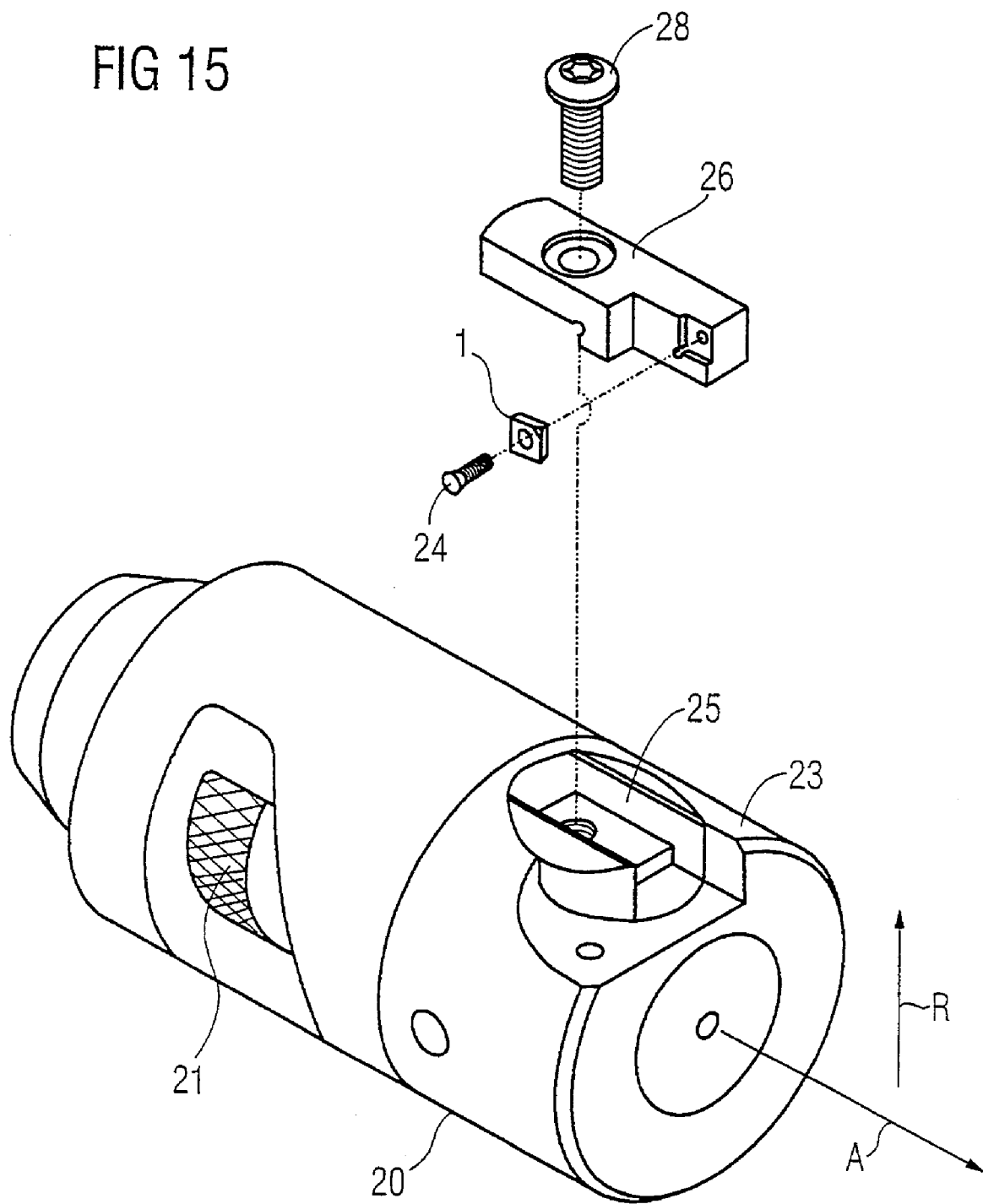
FIG. 15 is an exploded view in perspective of a precision-adjustable boring tool or drilling tool with a detachable insert cassette, and an insert according to at least one possible embodiment detachably mounted therein.

FIGS. 13 and 15 each show a boring tool 20 with a precision adjustment device 21. With this fine adjustment device 21, the insert 1 according to at least one possible embodiment that is detachably mounted on the boring tool or precision boring tool 20 can be adjusted with precision in the radial direction R, i.e. transverse to the axis direction A of the tool 20. A range of bore diameters can thus be bored or turned by using this precision adjustment capability.

Figure 14:
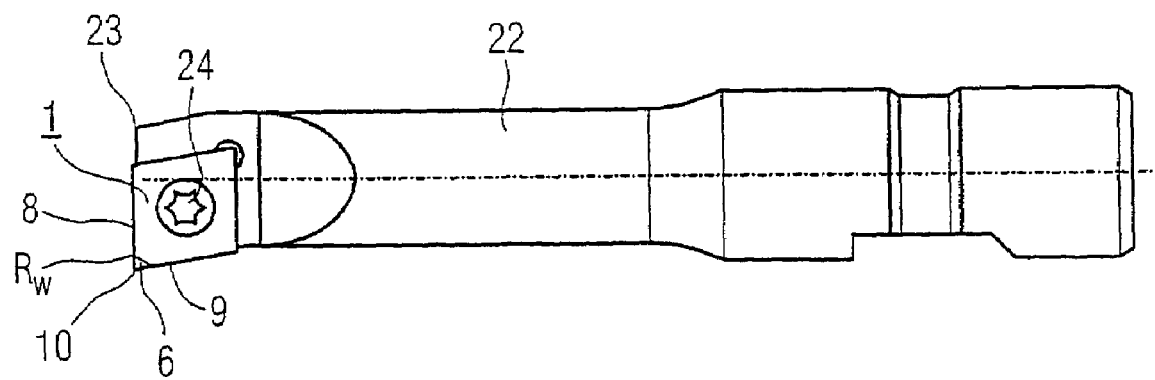
FIG. 14 shows a turning or boring head for a boring tool as illustrated in FIG. 13 with an insert according to at least one possible embodiment.

In the case of the boring tool 20 shown in FIG. 13, shown inserted in it and on an enlarged scale in FIG. 14 is a boring head 22. This boring head 22 carries, on the cutter or head end 23 on the peripheral side, the insert 1 according to at least one possible embodiment with chip breaker 6 and wiper geometry 8', $R_W$ on the secondary cutting edge 8. The insert 1 can thereby be detachably mounted, e.g., by means of a screw 24, on the front head end 23 of the boring head 22.

In the case of the boring tool 20 shown in FIG. 15, it is realized on the front head end 23 with a recess 25 for seating an insert cassette 26. The insert cassette 26 has an insert recess 27 for seating the insert 1 according to at least one possible embodiment, which is in turn detachably mounted there by means of a screw 24. The insert cassette 26 is likewise detachably mounted, e.g. by means of a screw 28, on the outer periphery of the boring tool 20.

One example of a high precision boring system that may be used in or in conjunction with at least one possible embodiment is the Romicron® boring system made by Industrias Romi SA, headquartered at Av Pérola Byington 56, Santa Barbara d'Oeste SP, 13453 900 Brazil. The Romicron® boring system is distributed by Kennametal Inc., headquartered at 1600 Technology Way, Latrobe, PA, 15650. Other examples of high precision boring systems may be found in the following U.S. patents, which are incorporated by reference herein: U.S. Pat. Nos. 5,971,675 to Romi, issued on Oct. 26, 1999; and 5,478,177 to Romi, issued on Dec. 26, 1995.

In at least one possible embodiment, the high precision boring system or tool is designed to permit adjustments of the position of a cutting insert by a distance of one micrometer or micron. Such precision adjustments permit precise boring of a hole or surface, whereby the finish of the bored surface has a minimized roughness in the range of 0.1 micrometer to 0.001 micrometer, and in steps of 0.001 micrometer in the range of 0.1 micrometer to 0.001 micrometer, and alternatively in steps below or above 0.001 micrometer. Of course, the range of surface roughnesses that may be achieved by precision boring will vary depending on the material used for the insert and the amount of wear and tear on the insert at the time of cutting, as well as the particular material being cut or bored. One example of how surface roughness may be measured may possibly be found in U.S. Pat. No. 6,688,817, issued to Borschert et al. on Feb. 10, 2004, which is hereby incorporated by reference herein.

During a boring operation, according to at least one possible embodiment, the insert deflects chips away from the surface of the material or workpiece being bored. The chip breaking or chip deflecting surface near the cutting edges is configured to maximize the deflection of the chips in order to minimize contact of chips with the surface of the material or workpiece being cut or bored. Such maximized deflection and minimized contact permits a very fine finish with minimized surface roughness to be achieved because the chips are substantially prevented from contacting and thus cutting and roughening the surface of the material or the workpiece. For example, if the chips were permitted to repeatedly and fully contact the surface of the workpiece, the fine finish would be roughened and cut by the chips, and thus a fine or very fine finish would be very difficult to achieve. By substantially preventing the chips from striking the surface of the workpiece as they are removed, the fine finish having a minimized surface roughness that is initially produced by the precision boring is retained.

One feature or aspect of an embodiment is believed at the time of the filing of this patent application to possibly reside broadly in an insert 1 with an insert surface 2 and insert side faces 5, and with a primary cutting edge 9 that adjoins a secondary cutting edge 8 via a corner cutting edge 10, comprising a chip breaker 6 provided in the region near the corner, with a chip breaker base 7 that extends from the secondary cutting edge 8 to the primary cutting edge 9.

Another feature or aspect of an embodiment is believed at the time of the filing of this patent application to possibly reside broadly in the insert, wherein the primary cutting edge 9 and the secondary cutting edge 8 form a triangle together with the chip breaker base 7.

Yet another feature or aspect of an embodiment is believed at the time of the filing of this patent application to possibly reside broadly in the insert, wherein the chip breaker 6 forms a cutting face 13 that descends from the corner cutting edge 10 to the chip breaker base 7.

Still another feature or aspect of an embodiment is believed at the time of the filing of this patent application to possibly reside broadly in the insert, wherein the chip breaker 6 forms a back cutting face 11 that ascends from the chip breaker base 7 to the insert surface 2.

A further feature or aspect of an embodiment is believed at the time of the filing of this patent application to possibly reside broadly in the insert, wherein the chip breaker base 7 of the chip breaker 6 is realized in the shape of a trough.

Another feature or aspect of an embodiment is believed at the time of the filing of this patent application to possibly reside broadly in the insert, wherein the chip breaker base 7 of the chip breaker 6 runs to the primary cutting edge 8 at an angle $\phi$ that is greater than or equal to 45° to less than 90°, in particular, 70±10°.

Yet another feature or aspect of an embodiment is believed at the time of the filing of this patent application to possibly reside broadly in the insert, wherein a finishing or wiping cutter 8', $R_W$ in wiper geometry is realized on the secondary cutting edge 8, Still another feature or aspect of an embodiment is believed at the time of the filing of this patent application to possibly reside broadly in the insert, wherein a negative rake angle $\alpha$ between the insert surface 2 and a secondary cutter 8', whereby the negative rake angle $\alpha$ is between −6° and −20°.

A further feature or aspect of an embodiment is believed at the time of the filing of this patent application to possibly reside broadly in the insert, wherein a positive side rake angle $\beta$ between the insert surface 2 and the chip breaker base 7 of the chip breaker 6, whereby the positive rake angle $\beta$ is between +6° and +30°.

Another feature or aspect of an embodiment is believed at the time of the filing of this patent application to possibly reside broadly in the insert, wherein the primary cutting edge 9 and the secondary cutting edge 8 run toward each other at an acute angle $\phi$, in particular at approximately 80°.

One feature or aspect of an embodiment is believed at the time of the filing of this patent application to possibly reside broadly in a boring tool 20, in particular, with a precision adjustment device 21, with a detachably mounted insert 1.

Another feature or aspect of an embodiment is believed at the time of the filing of this patent application to possibly reside broadly in the boring tool 20 with a detachable boring or turning head 22 on which the insert 1 is held.

Yet another feature or aspect of an embodiment is believed at the time of the filing of this patent application to possibly reside broadly in the boring tool 20 to which an insert cassette 26 that receives the insert 1 is detachably fastened.

One feature or aspect of an embodiment is believed at the time of the filing of this patent application to possibly reside broadly in a method of boring a hole using a boring arrangement with a cutting insert, said boring arrangement comprising: a substantially cylindrical body having a longitudinal axis and an axially extending slot; a tool supporting member supported by said cylindrical body, said tool supporting member being movable with respect to said cylindrical body and adapted to retain a boring tool; a rotatable ring mounted on said cylindrical body and rotatable about the longitudinal axis of said cylindrical body; said rotatable ring being configured to permit adjustment movements of said boring tool of a distance of at least one micrometer in micrometer increments; and a displacement arrangement for moving said tool supporting member upon rotation of said ring, said displacement arrangement comprising a crossbeam being arranged in said slot of said cylindrical body such that said crossbeam engages with said ring; and an elongate rod coupled to said crossbeam and said tool supporting member such that rotation of said ring causes movement of said crossbeam within said slot and thus movement of said elongate rod and said tool supporting member; a cutting insert comprising: a face surface and first and second side faces disposed substantially transverse to said face surface; a primary cutting edge disposed between said face surface and said first side face; a secondary cutting edge disposed between said face surface and said second side face; a corner cutting edge being disposed between and to join said primary cutting edge and said secondary cutting edge; a chip breaking structure being disposed in an area of said face surface adjacent said corner cutting edge; said chip breaking structure comprising a chip breaker bottom base surface disposed to extend from said secondary cutting edge to said primary cutting edge; said chip breaking structure being configured to deflect chips away from the surface of a workpiece being cut during precision boring or cutting of the workpiece; and said chip breaking structure being configured to maximize the number of chips deflected away from the surface of a workpiece being cut during boring or cutting of the workpiece to minimize contact of chips with the surface of the workpiece and thus to minimize the roughness of the surface in the range of 0.1 micrometer to 0.001 micrometer; said method comprising the steps of: rotating said rotatable ring to move said crossbeam of said displacement arrangement a distance of at least one micrometer; cutting a workpiece with said cutting insert; deflecting with said chip breaking structure chips away from the surface of the workpiece to minimize contact of chips with the surface of the workpiece to minimize the roughness of the surface in the range of 0.1 micrometer to 0.001 micrometer; and terminating cutting of the workpiece.

Another feature or aspect of an embodiment is believed at the time of the filing of this patent application to possibly reside broadly in the method, said method further comprising the steps of: rotating said rotatable ring to move said crossbeam of said displacement arrangement a distance of at least one micrometer to achieve a different depth of cut; cutting a workpiece with said cutting insert; deflecting with said chip breaking structure chips away from the surface of the workpiece to minimize contact of chips with the surface of the workpiece to minimize the roughness of the surface in the range of 0.1 micrometer to 0.001 micrometer; and terminating cutting of the workpiece.

Yet another feature or aspect of an embodiment is believed at the time of the filing of this patent application to possibly reside broadly in the method, wherein the primary cutting edge and the secondary cutting edge form a triangle together with the bottom base surface of the chip breaking structure.

Still another feature or aspect of an embodiment is believed at the time of the filing of this patent application to possibly reside broadly in the method, wherein: the chip breaker forms a cutting face that descends from the corner cutting edge to the bottom base surface; and the chip breaking structure forms a back cutting face that ascends from the bottom base surface to the insert surface.

A further feature or aspect of an embodiment is believed at the time of the filing of this patent application to possibly reside broadly in the method, wherein: the bottom base surface of the chip breaking structure is realized in the shape of a trough; the bottom base surface of the chip breaking structure runs to the primary cutting edge at an angle that is greater than or equal to 45° to less than 90°, in particular, (70±10)°; and a finishing or wiping cutter in wiper geometry is realized on the secondary cutting edge.

Another feature or aspect of an embodiment is believed at the time of the filing of this patent application to possibly reside broadly in the method, wherein: a negative rake angle is formed between the insert surface and a secondary cutter, whereby the negative rake angle is between −6° and −20°; a positive side rake angle is formed between the insert surface and the bottom base surface of the chip breaking structure, whereby the positive rake angle is between +60 and +30°; the primary cutting edge and the secondary cutting edge run toward each other at an acute angle, in particular at approximately 80°; and one of: said insert is held on a detachable boring or turning head; and said insert is held on a detachable insert cassette.

One feature or aspect of an embodiment is believed at the time of the filing of this patent application to possibly reside broadly in a cutting insert for use in precision boring, said insert comprising: a face surface and first and second side faces disposed substantially transverse to said face surface; a primary cutting edge disposed between said face surface and said first side face; a secondary cutting edge disposed between said face surface and said second side face; a corner cutting edge being disposed between and to join said primary cutting edge and said secondary cutting edge; a chip breaking structure being disposed in an area of said face surface adjacent said corner cutting edge; said chip breaking structure comprising a bottom base surface disposed to extend from said secondary cutting edge to said primary cutting edge; said chip breaking structure being configured to deflect chips away from the surface of a workpiece being cut during precision boring or cutting of the workpiece; and said chip breaking structure being configured to maximize the number of chips deflected away from the surface of a workpiece being cut during precision boring or cutting of the workpiece to minimize contact of chips with the surface of the workpiece to minimize the roughness of the surface in the range of 0.1 micrometer to 0.001 micrometer.

The invention also relates to a cutting plate 1 comprising a plate surface 2, lateral plate faces 5, a main cutting edge 9 that borders a secondary cutting edge 8 via a corner cutting edge 10, and a chip-forming stage 6 that is located in the zone near the corner and is provided with a stage base 7 which extends from the secondary cutting edge 8 to the main cutting edge 9.

One example of a fine adjustment boring tool, the components of which may be used or possibly used in at least one possible embodiment may possibly be found in U.S. Pat. No. 4,878,787, issued Nov. 7, 1989.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the international search report mailed Jun. 28, 2005, and/or cited elsewhere are hereby incorporated by reference as if set forth in their entirety herein as follows: U.S. Pat. No. 5,584,616; DE2414232; WO03070404; U.S. Pat. No. 4,441,841; DE1849107U; EP0422586; DE10234030; JP1228705; JP5096402; XP002331839; SU1214333; and XP002331838.

The corresponding foreign and international patent publication applications, namely, Federal Republic of Germany Patent Application No. 20 2004 002 491.8, filed on Feb. 17, 2004, having inventors Ulrich KRENZER and Werner JUST, and DE-OS 20 2004 002 491.8 and DE-PS 20 2004 002 491.8, and International Application No. PCT/EP2005/001386, filed on Feb. 11, 2005, having WIPO Publication No. WO2005/080034 and inventors Ulrich KRENZER and Werner JUST, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be

What is claimed is:

1. A method of boring a hole using a boring arrangement with a cutting insert, said boring arrangement comprising: a substantially cylindrical body having a longitudinal axis and an axially extending slot; a tool supporting member supported by said cylindrical body, said tool supporting member being movable with respect to said cylindrical body and adapted to retain a boring tool; a rotatable ring mounted on said cylindrical body and rotatable about the longitudinal axis of said cylindrical body; said rotatable ring being configured to permit adjustment movements of said boring tool of a distance of at least one micrometer in micrometer increments; and a displacement arrangement for moving said tool supporting member upon rotation of said ring, said displacement arrangement comprising a crossbeam being arranged in said slot of said cylindrical body such that said crossbeam engages with said ring; and an elongate rod coupled to said crossbeam and said tool supporting member such that rotation of said ring causes movement of said crossbeam within said slot and thus movement of said elongate rod and said tool supporting member; a cutting insert comprising: a face surface and first and second side faces disposed substantially transverse to said face surface; a primary cutting edge disposed between said face surface and said first side face; a secondary cutting edge disposed between said face surface and said second side face; a corner cutting edge being disposed between and to join said primary cutting edge and said secondary cutting edge; a chip breaking structure being disposed in an area of said face surface adjacent said corner cutting edge; said chip breaking structure comprising a chip breaker bottom base surface disposed to extend from said secondary cutting edge to said primary cutting edge; said chip breaking structure being configured to deflect chips away from the surface of a workpiece being cut during precision boring or cutting of the workpiece; and said chip breaking structure being configured to maximize the number of chips deflected away from the surface of a workpiece being cut during boring or cutting of the workpiece to minimize contact of chips with the surface of the workpiece and thus to minimize the roughness of the surface in the range of 0.1 micrometer to 0.001 micrometer; said method comprising the steps of:

rotating said rotatable ring to move said crossbeam of said displacement arrangement a distance of at least one micrometer;

cutting a workpiece with said cutting insert;

deflecting with said chip breaking structure chips away from the surface of the workpiece to minimize contact of chips with the surface of the workpiece to minimize the roughness of the surface in the range of 0.1 micrometer to 0.001 micrometer; and terminating cutting of the workpiece.

2. The method according to claim 1, said method further comprising the steps of:

rotating said rotatable ring to move said crossbeam of said displacement arrangement a distance of at least one micrometer to achieve a different depth of cut;

cutting a workpiece with said cutting insert;

deflecting with said chip breaking structure chips away from the surface of the workpiece to minimize contact of chips with the surface of the workpiece to minimize the roughness of the surface in the range of 0.1 micrometer to 0.001 micrometer; and terminating cutting of the workpiece.

3. The method according to claim 2, wherein the primary cutting edge and the secondary cutting edge form a triangle together with the bottom base surface of the chip breaking structure.

4. The method according to claim 3, wherein:

the chip breaker forms a cutting face that descends from the corner cutting edge to the bottom base surface; and the chip breaking structure forms a back cutting face that ascends from the bottom base surface to the insert surface.

5. The method according to claim 4, wherein:

the bottom base surface of the chip breaking structure is realized in the shape of a trough;

the bottom base surface of the chip breaking structure runs to the primary cutting edge at an angle that is one of: greater than or equal to 45° to less than 90°, and (70±10)°; and a finishing or wiping cutter in wiper geometry is realized on the secondary cutting edge.

6. The method according to claim 5, wherein:

a negative rake angle is formed between the insert surface and a secondary cutter, whereby the negative rake angle is between −6° and −20°;

a positive side rake angle is formed between the insert surface and the bottom base surface of the chip breaking structure, whereby the positive rake angle is between +6° and +30°;

the primary cutting edge and the secondary cutting edge run toward each other at an acute angle of approximately 80°; and one of: said insert is held on a detachable boring or turning head; and said insert is held on a detachable insert cassette.

7. A cutting insert for use in precision boring, said insert comprising:

a face surface and first and second side faces disposed substantially transverse to said face surface;

a primary cutting edge disposed between said face surface and said first side face;

a secondary cutting edge disposed between said face surface and said second side face;

a corner cutting edge being disposed between and to join said primary cutting edge and said secondary cutting edge;

a chip breaking structure being disposed in an area of said face surface adjacent said corner cutting edge;

said chip breaking structure comprising a bottom base surface disposed to extend from said secondary cutting edge to said primary cutting edge;

said chip breaking structure being configured to deflect chips away from the surface of a workpiece being cut during precision boring or cutting of the workpiece; and said chip breaking structure being configured to maximize the number of chips deflected away from the surface of a workpiece being cut during precision boring or cutting of the workpiece to minimize contact of chips with the surface of the workpiece to minimize the roughness of the surface in the range of 0.1 micrometer to 0.001 micrometer;

the primary cutting edge and the secondary cutting edge form a triangle together with the bottom base surface of the chip breaking structure;

the chip breaker forms a cutting face that descends from the corner cutting edge to the bottom base surface;

the chip breaking structure forms a back cutting face that ascends from the bottom base surface to the insert surface;

the bottom base surface of the chip breaking structure is realized in the shape of a trough;

the bottom base surface of the chip breaking structure runs to the primary cutting edge at an angle that is one of: greater than or equal to 45° to less than 90°, and (70°±10)°; and a finishing or wiping cutter in wiper geometry is realized on the secondary cutting edge.

8. The insert according to claim 7, wherein:

a negative rake angle is formed between the insert surface and a secondary cutter, whereby the negative rake angle is between −6° and −20°;

a positive side rake angle is formed between the insert surface and the bottom base surface of the chip breaking structure, whereby the positive rake angle is between +6° and +30°; and the primary cutting edge and the secondary cutting edge run toward each other at an acute angle of approximately 80°.

9. The insert according to claim 8, wherein said insert is configured to be detachably mounted to a boring tool.

10. An insert (1) with an insert surface (2) and insert side faces (5), and with a primary cutting edge (9) that adjoins a secondary cutting edge (8) via a corner cutting edge (10), characterized by a chip breaker (6) provided in the region near the corner, with a chip breaker base (7) that extends from the secondary cutting edge (8) to the primary cutting edge (9).

11. The insert according to claim 10, wherein the primary cutting edge (9) and the secondary cutting edge (8) form a triangle together with the chip breaker base (7).

12. The insert according to claim 11, wherein:

the chip breaker (6) forms a cutting face (13) that descends from the corner cutting edge (10) to the chip breaker base (7); and the chip breaker (6) forms a back cutting face (11) that ascends from the chip breaker base (7) to the insert surface (2).

13. The insert according to claim 12, wherein:

the chip breaker base (7) of the chip breaker (6) is realized in the shape of a trough;

the chip breaker base (7) of the chip breaker (6) runs to the primary cutting edge (8) at an angle ($\angle$) that is one of: greater than or equal to 45° to less than 90°, and (70°±10)°; and a finishing or wiping cutter (8', $R_W$) in wiper geometry is realized on the secondary cutting edge (8).

14. The insert according to claim 13, wherein:

a negative rake angle ($\alpha$) is formed between the insert surface (2) and a secondary cutter (8'), whereby the negative rake angle ($\alpha$) is between (−6)° and (−20)°;

a positive side rake angle ($\beta$) is formed between the insert surface (2) and the chip breaker base (7) of the chip breaker (6), whereby the positive rake angle ($\beta$) is between (+6)° and (+30)°; and the primary cutting edge (9) and the secondary cutting edge (8) run toward each other at an acute angle ($\phi$) approximately 80°.

15. The boring tool (20) with a precision adjustment device (21), with a detachably mounted insert (1) according to claim 14.

16. The boring tool (20) according to claim 15, with a detachable boring or turning head (22) on which the insert (1) is held.

17. The boring tool (20) according to claim 15, to which an insert cassette (26) that receives the insert (1) is detachably fastened.

\* \* \* \* \*